United States Patent
Parolini et al.

(10) Patent No.: US 10,391,724 B2
(45) Date of Patent: *Aug. 27, 2019

(54) METHOD OF FORMING PRE-FORM CERAMIC MATRIX COMPOSITE MOLD AND METHOD OF FORMING A CERAMIC MATRIX COMPOSITE COMPONENT

(71) Applicant: GENERAL ELECTRIC COMPANY, Schenectady, NY (US)

(72) Inventors: Jason Robert Parolini, Greer, SC (US); John McConnell Delvaux, Fountain Inn, SC (US); Canan Uslu Hardwicke, Simpsonville, SC (US); Glenn Curtis Taxacher, Simpsonville, SC (US); James Joseph Murray, Piedmont, SC (US)

(73) Assignee: GENERAL ELECTRIC COMPANY, Schenectady, NY (US)

(*) Notice: Subject to any disclaimer, the term of this patent is extended or adjusted under 35 U.S.C. 154(b) by 256 days.

This patent is subject to a terminal disclaimer.

(21) Appl. No.: 15/433,548

(22) Filed: Feb. 15, 2017

(65) Prior Publication Data
US 2018/0229451 A1   Aug. 16, 2018

(51) Int. Cl.
*B29C 70/44* (2006.01)
*B29D 99/00* (2010.01)
*F01D 25/00* (2006.01)
*B32B 18/00* (2006.01)
*B29C 70/02* (2006.01)
(Continued)

(52) U.S. Cl.
CPC ............ *B29C 70/44* (2013.01); *B29C 70/025* (2013.01); *B29D 99/0028* (2013.01); *B32B 18/00* (2013.01); *C04B 35/806* (2013.01); *C04B 37/001* (2013.01); *F01D 25/005* (2013.01); *C04B 2235/94* (2013.01); *C04B 2235/95* (2013.01); *C04B 2237/38* (2013.01); *F05D 2260/202* (2013.01); *F05D 2300/6033* (2013.01)

(58) Field of Classification Search
None
See application file for complete search history.

(56) References Cited

U.S. PATENT DOCUMENTS

| 3,505,278 A | 4/1970 | Elarde et al. |
| 4,851,376 A | 7/1989 | Asami et al. |
| 5,437,820 A | 8/1995 | Brotz |

(Continued)

OTHER PUBLICATIONS

Extended European Search Report and Opinion issued in connection with corresponding EP Application No. 18154120.2 dated Jun. 12, 2018.

*Primary Examiner* — Monica A Huson
(74) *Attorney, Agent, or Firm* — McNees Wallace & Nurick LLC (57) ABSTRACT

A method of forming a pre-form ceramic matrix composite mold for a ceramic matrix composite (CMC) component including providing pieces of CMC remnant scrap material and randomly arranging the pieces of CMC remnant scrap material relative to one another. The method further includes debulking the pieces of CMC remnant scrap material into a rigidized shape, the rigidized shape having gaps between adjacent pieces of CMC remnant scrap material of about 10 microns and about 10 mm and a gap spacing between about 50 microns and about 50 mm, and forming the rigidized shape into a mold.

7 Claims, 6 Drawing Sheets

(51) Int. Cl.
*C04B 35/80* (2006.01)
*C04B 37/00* (2006.01)

(56) References Cited

U.S. PATENT DOCUMENTS

| | | |
|---|---|---|
| 5,858,289 A | 1/1999 | Hart |
| 7,066,717 B2 | 6/2006 | Morrison et al. |
| 7,148,170 B2 | 12/2006 | Sasaki et al. |
| 7,300,621 B2 | 11/2007 | Merrill |
| 9,005,382 B2 | 4/2015 | Steibel et al. |
| 9,050,769 B2 * | 6/2015 | Monaghan ............. F01D 5/282 |
| 9,234,430 B2 | 1/2016 | Cairo et al. |
| 9,327,352 B2 | 5/2016 | Fukushima |
| 2006/0211564 A1 | 9/2006 | Merrill |
| 2013/0218281 A1 | 8/2013 | Broadley et al. |
| 2014/0099484 A1 | 4/2014 | Roberts, III et al. |
| 2016/0161121 A1 | 6/2016 | Chang |
| 2016/0230569 A1 | 8/2016 | Duelm et al. |

* cited by examiner

METHOD OF FORMING PRE-FORM CERAMIC MATRIX COMPOSITE MOLD AND METHOD OF FORMING A CERAMIC MATRIX COMPOSITE COMPONENT

FIELD OF THE INVENTION

The present invention relates generally to gas turbines for power generation and more specifically to methods of forming ceramic matrix composite components for gas turbines.

BACKGROUND OF THE INVENTION

In order to increase efficiency and performance of gas turbines so as to provide increased power generation, lower emissions and improved specific fuel consumption, turbines are tasked to operate at higher temperatures and under harsher conditions. Such conditions become a challenge for cooling of certain materials.

As operating temperatures have increased, new methods of cooling alloys have been developed. For example, ceramic thermal barrier coatings (TBCs) are applied to the surfaces of components in the stream of the hot effluent gases of combustion to reduce the heat transfer rate and to provide thermal protection to the underlying metal and allow the components to withstand higher temperatures. Also, cooling holes are used to provide film cooling to improve thermal capability or protection. Concurrently, ceramic matrix composites (CMCs) have been developed as substitutes for some alloys. The CMCs provide more desirable temperature and density properties in comparison to some metals; however, they present additional challenges.

Processing laminated composite turbine airfoils, such as with CMCs, has been shown to be effectively executed using melt infiltration (MI). However, often times, processing problems arise when the laminates become thick and/or the geometry becomes complex. Incomplete densification of the interior regions of the laminate will result when the matrix-forming infiltrant material (usually Si or an Si-based alloy) is unable to fill the entire preform during melt infiltration. The undesirable microstructure that forms is characterized by large lacks of infiltration, porosity, and voids. Typically, such defect structures result in large degradation of most mechanical properties, including interlaminar behavior, matrix-dominated properties such as proportional limit, and fiber-dominated properties such as tensile strength and ductility. All of which are undesirable.

These densification problems are especially acute when processing thick sections having certain microstructural traits such as very high fiber volume fractions, highly non-uniform fiber distributions, and tightly consolidated preform matrices. In some instances, these microstructural features tend to further slow infiltration rates during processing, exacerbating the densification problems and attendant mechanical property reductions described earlier. Additionally, densification of thick section components might benefit from longer process times at melt infiltration temperatures; however, such long processing times can damage the fiber-matrix interface and lead to unacceptable degradation of mechanical properties.

SUMMARY OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

According to an exemplary embodiment of the present disclosure, a method of forming a pre-form ceramic matrix composite mold for a ceramic matrix composite (CMC) component includes providing pieces of CMC remnant scrap material and randomly arranging the pieces of CMC remnant scrap material relative to one another. The method further includes debulking the pieces of CMC remnant scrap material into a rigidized shape, the rigidized shape having gaps between adjacent pieces of CMC remnant scrap material of about 10 microns and about 10 mm and a gap spacing between about 50 microns and about 50 mm. The method further includes forming the rigidized shape into a mold.

According to another exemplary embodiment of the present disclosure, a forming a ceramic matrix composite (CMC) component includes forming a pre-form CMC mold. The method further includes forming a pre-form CMC mold including providing pieces of CMC remnant scrap material and randomly arranging the pieces of CMC remnant scrap material relative to one another. The method further includes debulking the pieces of CMC remnant scrap material into a rigidized shape, the rigidized shape having gaps between adjacent pieces of CMC remnant scrap material of about 10 microns and about 10 mm and a gap spacing between about 50 microns and about 50 mm. The method further includes forming the rigidized shape into the pre-form CMC mold, providing a lay-up tool having a first surface and a second surface, and applying a first base ply to the first surface of the lay-up tool. The method further includes laying-up a first set of CMC plies adjacent to the first base ply, placing the pre-form CMC mold adjacent to the first set of CMC plies in the lay-up tool, and laying-up a second set of CMC plies adjacent to the pre-form CMC mold. The method further includes applying a second base ply to the second set of CMC plies, the second base ply adjacent to the second surface of the lay-up tool. The method further includes, after the step of applying the second base ply, autoclaving the first base ply, the first set of CMC plies, the pre-form CMC mold, the second set of CMC plies and the second base ply. The method further includes densifying the first base ply, the first set of CMC plies, the pre-form CMC mold, the second set of CMC plies, and the second base ply.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

Wherever possible, the same reference numbers will be used throughout the drawings to represent the same parts.

DETAILED DESCRIPTION OF THE INVENTION

Provided is an exemplary ceramic matrix composite article and ceramic matrix composite fabrication process. Embodiments of the present disclosure, for example, in comparison to articles and processes without one or more of the features described herein, improve matrix infiltration during fabrication, permit increase in efficiency and performance of turbines, including increased load carrying capability, permit ceramic matrix composite materials to be operated at higher temperatures, permit interlaminar flexibility in thick sections of ceramic matrix composite articles for use with melt infiltration, reduce or eliminate premature interlaminar failure, or combinations thereof.

Figure 1:
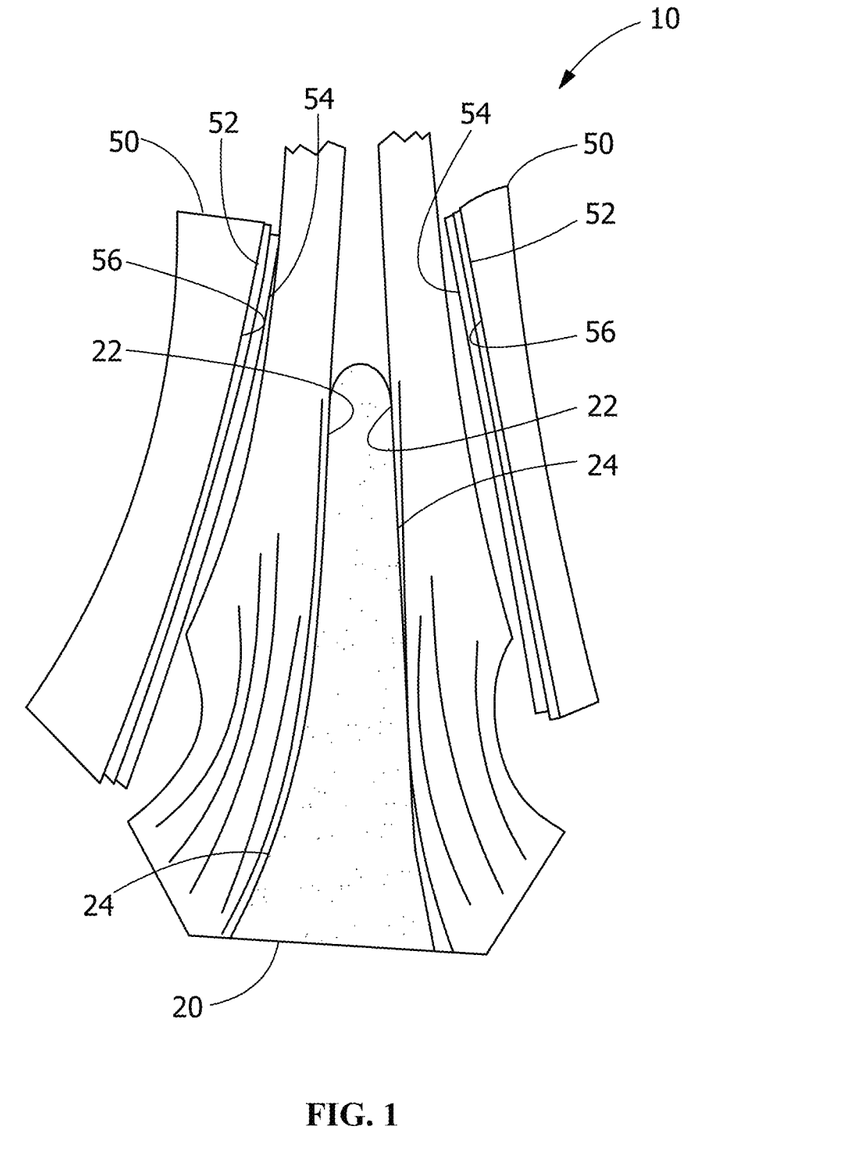
FIG. 1 is an elevation view of an exemplary ceramic matrix composite (CMC) component of the present disclosure.

Systems used to generate power include, but are not limited to, gas turbines, steam turbines, and other turbine assemblies such as land based aero-derivatives used for power generation. In certain applications, the power generation systems, including the turbomachinery therein (e.g., turbines, compressors, and pumps) and other machinery may include components that are exposed to heavy wear conditions. For example, certain power generation system components 20 (FIG. 1), such as blades, buckets, shrouds, nozzles, and so forth, may operate in high heat and high revolution environments. These components are manufactured using ceramic matrix composites and these components may also include cooling passages. The present disclosure provides a method to form ceramic matrix composite (CMC) components including cooling passages.

For purposes herein, power generation system components, ceramic matrix composite components, ceramic matrix components and the like are used interchangeably.

For purposes herein, remnant scrap material, scrap material, remnants, scraps, each of which terms may appear in combination of the abbreviation "CMC" or the like may be used interchangeably.

Figure 2:
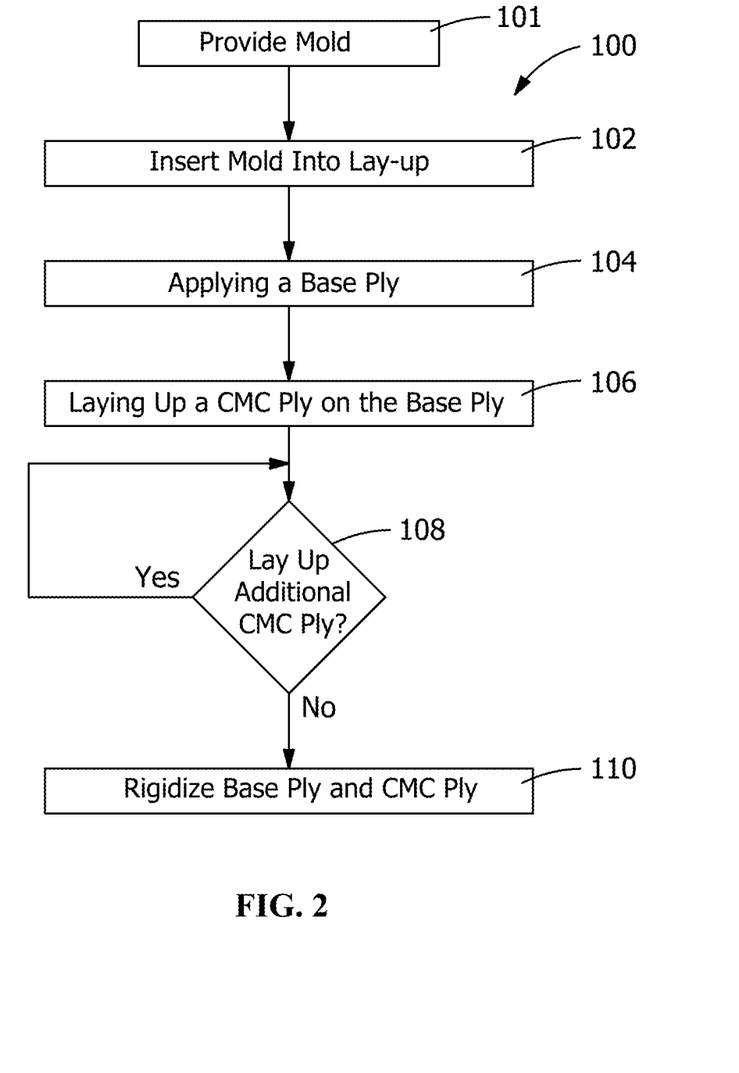
FIG. 2 is a flow chart of the method of making an exemplary pre-form CMC mold for a CMC component of the present disclosure.

A method 100 of forming a CMC component 10 (FIG. 1) using a pre-form CMC mold 20 (FIG. 1) is shown in FIG. 2. Method 100 includes providing mold 20, as shown in step 101. Method 100 includes inserting mold 20 (FIG. 1) into a lay-up, such as a lay-up tool 50 (FIG. 1) as shown in step 102. Method 100 includes applying a base ply 22 (FIG. 1) to mold 20 (FIG. 1), as well as applying a base ply 52 to each respective surface 61 of layup tool 50 as shown in step 104. Method 100 includes laying up a CMC ply 24 (FIG. 1) on base ply 22, as well as laying up a CMC ply 54 to each respective base ply 52 as shown in step 106. Method 100 includes laying up additional CMC plies 24, as shown in step 108. Once all CMC plies 24 been laid up, method 100 includes at least partially rigidizing base ply 22, 52 and CMC ply(ies) 24, 54 thereby forming pre-form CMC component 10. As utilized herein, partially rigidized refers to a curing or rigidization process, such as by autoclave, wherein organics or other volatiles are removed from plies 22, 24, 52, 54 to at least partially rigidize the structure. The rigidization includes a sufficient cure to rigidize the structure for further processing. The temperatures and times for partial rigidization vary based upon the desired level of rigidization and the amount and type of matrix present in the plies 22, 24, 52, 54.

Figure 3:
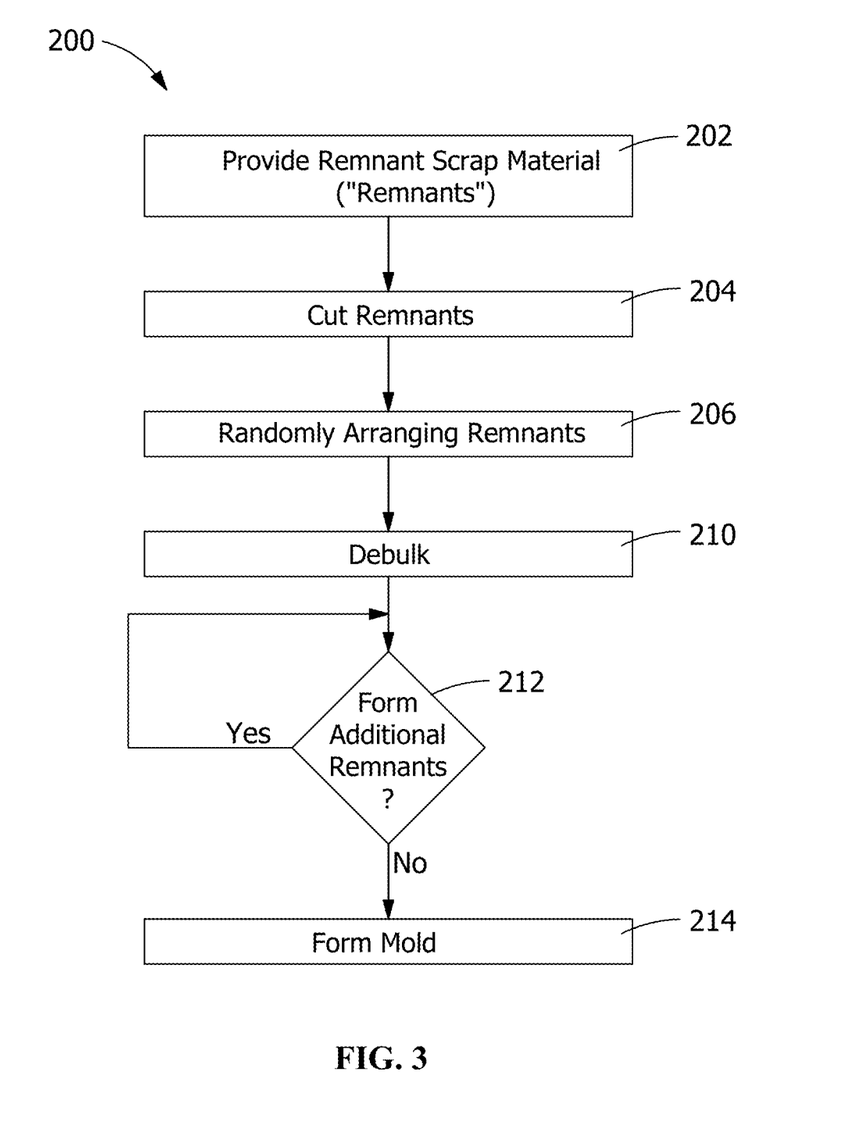
FIG. 3 is a flow chart of the method of making an exemplary mold of the present disclosure.
Figure 6:
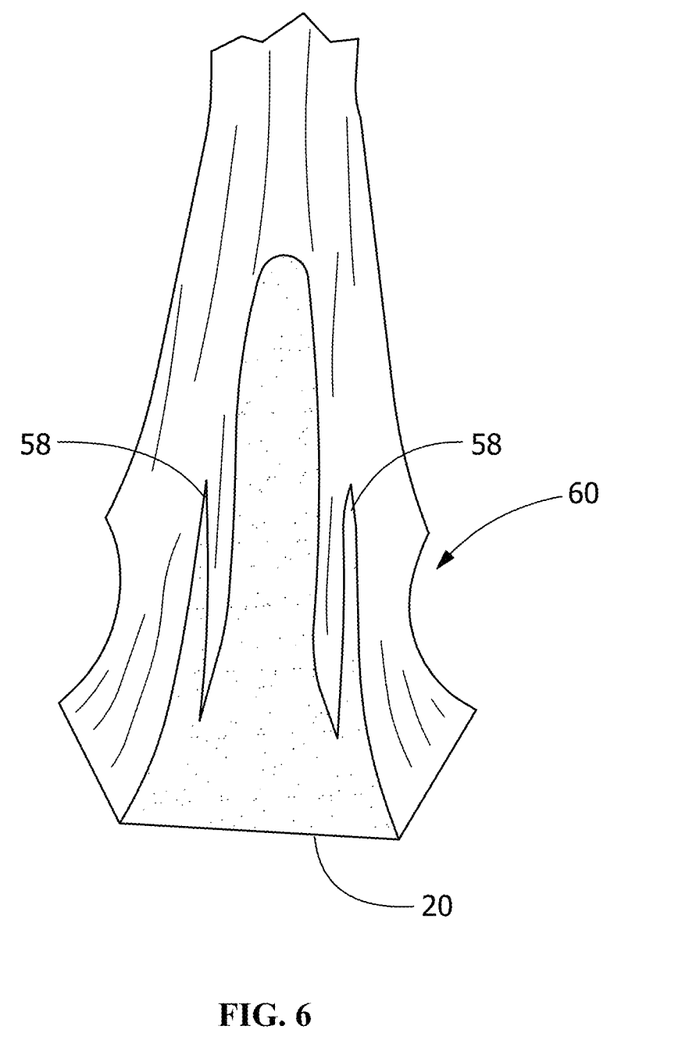
FIG. 6 is an elevation view of an exemplary scarf joint in a CMC component of the present disclosure.
Figure 7:
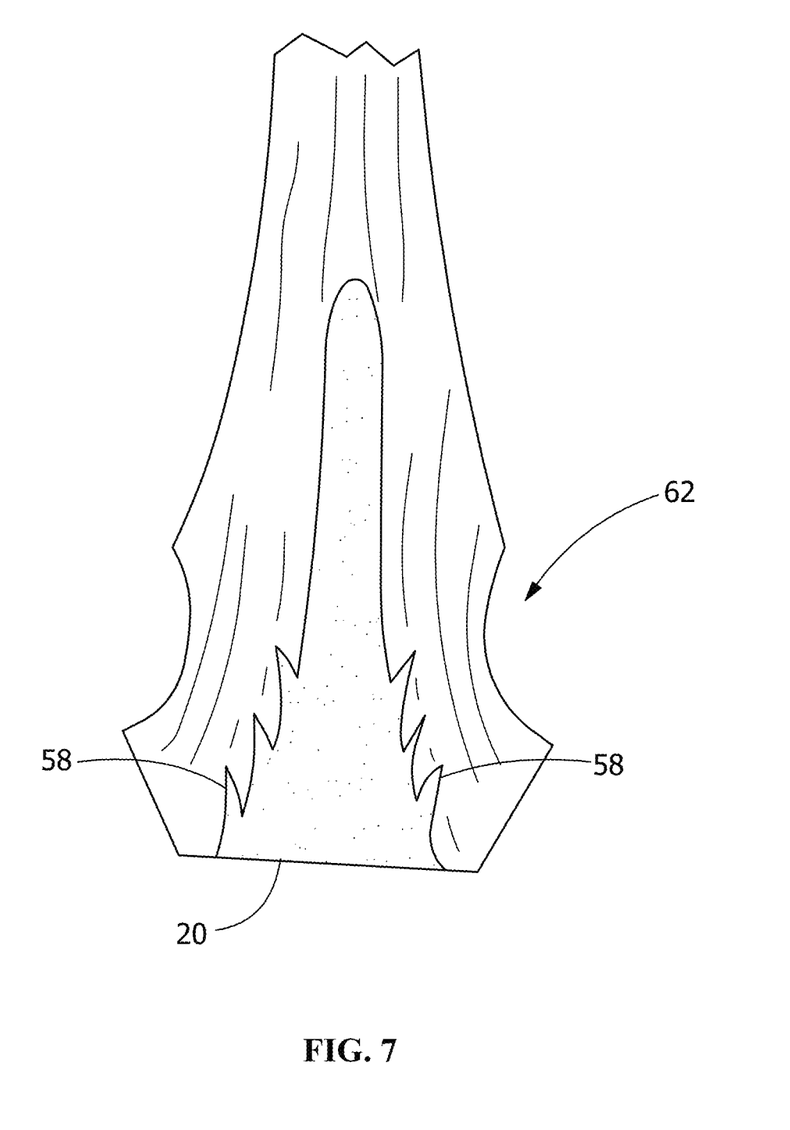
FIG. 7 is an elevation view of an exemplary sawtooth joint in a CMC component of the present disclosure.

A method 200 of forming a mold 20 (FIG. 1) for use in forming a pre-form CMC cavity is shown in FIG. 3. Method 200 includes providing remnant scrap material ("remnants"). That is, remnants are surplus or leftover segments or pieces of uni-directional tape from other matrix composite manufacturing processes, as shown in step 202. Any suitable tapes may be used, depending upon the requirements of the CMC component. In one embodiment, remnant widths can vary from about 0.5 to about 1.25 inch (about 20 to about 49 mm), including, but not limited to any increment in between, such as about 0.8 inch (31 mm), about 1 inch (39 mm), and about 1.2 inch (47 mm). However, the present disclosure is not so limited, as remnant widths less than 0.5 inch (20 mm) and greater than 1.2 inch (47 mm) can be used. Method 200 optionally includes cutting remnants to predetermined sizes and/or shapes, as shown in step 204 such as generally square segments or pieces. In one embodiment, the remnants can define other geometric shapes. Optionally, method 200 includes randomly arranging remnants 30 (FIG. 4) composed of generally equally numbers differently sized segments or pieces, as shown in step 206. However, in one embodiment, the numerical distribution of differently sized remnants relative to one another can be random. Method 200 includes debulking, or application of a combination of vacuum pressure and temperature to panel 150, as a result of forming additional remnants 30 as shown in step 210. Method 200 includes additionally forming panel 150, as shown in step 212. Once panel 150 has been formed and debulked (repeating steps 206 and 210), panel 150 (FIG. 5) is formed into a rigidized shape, the rigidized shape or rigidized panel shape is formed into mold 20 (FIG. 1), as shown in step 214. The mold is formed by machining the exterior surfaces of the panel until the desired shape and surface features of the mold are achieved (e.g., see FIG. 1). In one embodiment, surface features are formed in the mold to increase the surface area between the mold (composed of short or discontinuous fiber layers) and plies 22, 24 (continuous fiber layers), especially in regions experiencing stresses during rigidizing (step 110; FIG. 2) For example, forming protrusions 58 (FIGS. 6, 7) in the surface of mold 20 permits the formation of a scarf joint 60 (FIG. 6), or a sawtooth joint 62 or other suitable surface features may be formed in order to increase the joint surface for facilitating shearing forces between plies 22, 24 and the mold plies during rigidizing.

Figure 4:
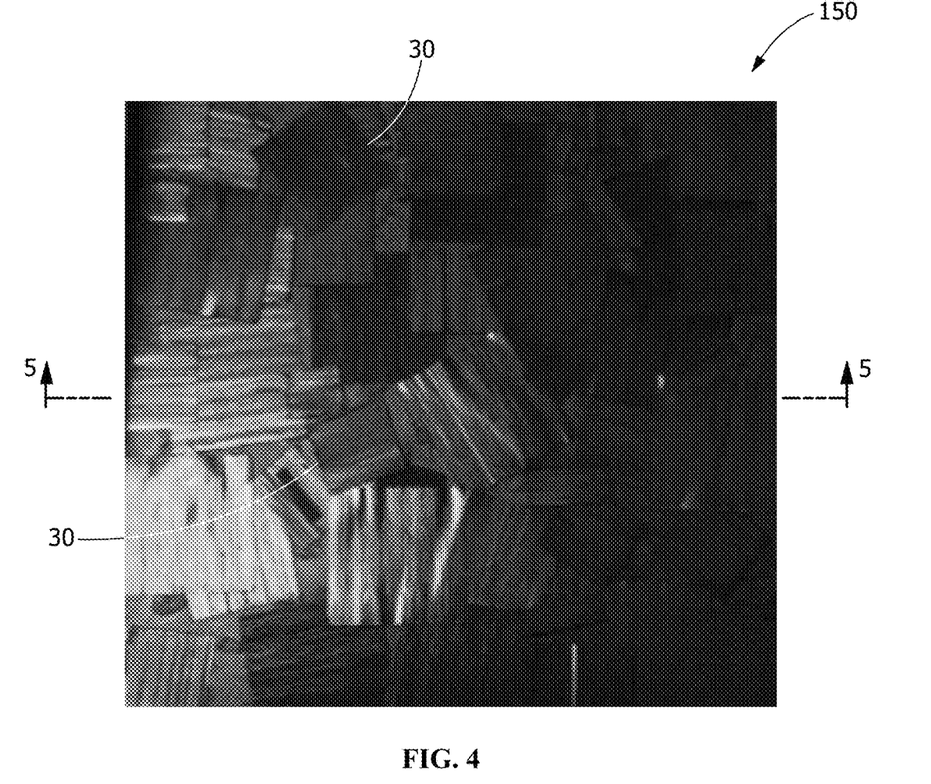
FIG. 4 is a plan view of an exemplary panel of the present disclosure.
Figure 5:
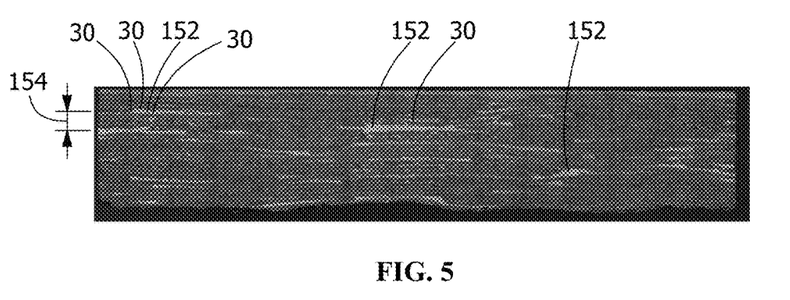
FIG. 5 is a cross section of remnant scrap material taken along line 5-5 of the panel of FIG. 4 of the present disclosure.

FIG. 5 shows a cross section taken along line 5-5 of panel 150 of FIG. 4. Gaps 152 are formed by adjacent remnants 30. In one embodiment, gaps 152 can range in size between about 10 microns and about 10 mm. In other embodiments, gaps can range between about 100 microns and about 5 mm, about 500 microns and about 3 mm, about 10 mm and about 2 mm, or any combination in between 10 microns and about 10 mm. In one embodiment, the porosity or spacing or density or gap spacing 154 between adjacent gaps 152 can range from about 50 microns and about 50 mm. In other embodiments, gaps can range between about 100 microns and about 40 mm, about 500 microns and about 30 mm, about 10 mm and about 20 mm, or any combination in between about 50 microns and about 50 mm. Due to the morphology resulting from the random arrangement of the remnants making up the adjacent remnants, improved infiltration during fabrication can be achieved. That is, the gap size ranges and gap spacings are a balance between improving infiltration and component stress levels.

For purposes herein, the term "gap spacing" is intended to mean the distance perpendicular to the laminate structure between adjacent gaps.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of forming a pre-form ceramic matrix composite mold for a ceramic matrix composite (CMC) component comprising:
    providing pieces of CMC remnant scrap material;
    randomly arranging the pieces of CMC remnant scrap material relative to one another;
    debulking the pieces of CMC remnant scrap material into a rigidized shape, the rigidized shape having gaps between adjacent pieces of CMC remnant scrap material of about 10 microns and about 10 mm and a gap spacing between about 50 microns and about 50 mm; and
    forming the rigidized shape into a mold.

2. The method of claim 1, wherein the pieces of CMC remnant scrap material are generally square shaped.

3. The method of claim 2, wherein sides of the pieces of CMC remnant scrap material are between about 20 and about 49 mm in length.

4. The method of claim 3, wherein the CMC remnant scrap material is composed of generally equal numbers of differently sized pieces.

5. A method of forming a ceramic matrix composite (CMC) component comprising:
    forming a pre-form CMC mold comprising:
        providing pieces of CMC remnant scrap material;
        randomly arranging the pieces of CMC remnant scrap material relative to one another;
        debulking the pieces of CMC remnant scrap material into a rigidized shape, the rigidized shape having gaps between adjacent pieces of CMC remnant scrap material of about 10 microns and about 10 mm and a gap spacing between about 50 microns and about 50 mm; and
        forming the rigidized shape into the pre-form CMC mold; and
    providing a lay-up tool having a first surface and a second surface;
    applying a first base ply to the first surface of the lay-up tool;
    laying-up a first set of CMC plies adjacent to the first base ply;
    placing the pre-form CMC mold adjacent to the first set of CMC plies in the lay-up tool;
    laying-up a second set of CMC plies adjacent to the pre-form CMC mold;
    applying a second base ply to the second set of CMC plies, the second base ply adjacent to the second surface of the lay-up tool;
    after the step of applying the second base ply, autoclaving the first base ply, the first set of CMC plies, the pre-form CMC mold, the second set of CMC plies and the second base ply; and
    densifying the first base ply, the first set of CMC plies, the pre-form CMC mold, the second set of CMC plies, and the second base ply.

6. The method of claim 5, wherein applying a second base ply to the pre-form CMC mold includes increasing a joint surface between a mold surface and the base ply.

7. The method of claim 6, wherein increasing a joint surface between the mold surface and the base ply includes forming a scarf joint or forming a sawtooth pattern in the mold surface.

* * * * *